(12) United States Patent
Hirani et al.

(10) Patent No.: US 7,783,560 B2
(45) Date of Patent: Aug. 24, 2010

(54) CREDIT EVENT FIXINGS

(75) Inventors: Sunil G. Hirani, New York, NY (US);
Scott Hassal, Hamilton (CA); F. Charles Doerr, New York, NY (US);
Mazyar M. Dar, New York, NY (US)

(73) Assignee: Creditex Group, Inc., New York, NY (US)

( * ) Notice: Subject to any disclaimer, the term of this patent is extended or adjusted under 35 U.S.C. 154(b) by 606 days.

(21) Appl. No.: 11/507,645

(22) Filed: Aug. 22, 2006

(65) Prior Publication Data

US 2007/0239576 A1    Oct. 11, 2007

Related U.S. Application Data (60) Provisional application No. 60/783,074, filed on Mar. 17, 2006.

(51) Int. Cl.
*G06Q 40/00* (2006.01)
(52) U.S. Cl. .......................................... 705/37
(58) Field of Classification Search .............. 705/35–45
See application file for complete search history.

(56) References Cited

U.S. PATENT DOCUMENTS 6,317,727 B1    11/2001    May
6,347,307 B1    2/2002    Sandhu et al.

(Continued)

OTHER PUBLICATIONS

International Search Report and Written Opinion dated Oct. 2, 2007, directed to counterpart PCT application No. PCT/US07/06369.

(Continued)

*Primary Examiner*—Richard C Weisberger
(74) *Attorney, Agent, or Firm*—DLA Piper LLP (US)

(57) ABSTRACT

Disclosed are methods and systems for transacting credit derivatives. The methods and systems allow for the calculation of the final cash settlement prices for credit derivatives following a credit event, such as a corporate bankruptcy.

10 Claims, 9 Drawing Sheets

U.S. PATENT DOCUMENTS

| | | |
|---|---|---|
| 6,377,940 B2 | 4/2002 | Tilfors et al. |
| 6,405,180 B2 | 6/2002 | Tilfors et al. |
| 6,408,282 B1 | 6/2002 | Buist |
| 6,505,174 B1 | 1/2003 | Keiser |
| 6,618,707 B1 | 9/2003 | Gary |
| 6,725,201 B2 | 4/2004 | Joao |
| 6,996,540 B1 | 2/2006 | May |
| 7,177,833 B1 | 2/2007 | Marynowski et al. |
| 7,212,997 B1 | 5/2007 | Pine et al. |
| 7,251,629 B1 | 7/2007 | Marynowski et al. |
| 7,333,950 B2 | 2/2008 | Shidler et al. |
| 2001/0056393 A1 | 12/2001 | Tilfors et al. |
| 2002/0042765 A1 | 4/2002 | Dawson |
| 2002/0052822 A1 | 5/2002 | Terashima |
| 2002/0055897 A1 | 5/2002 | Shidler et al. |
| 2002/0116314 A1 | 8/2002 | Spencer et al. |
| 2002/0116317 A1 | 8/2002 | May |
| 2002/0194107 A1 | 12/2002 | Li et al. |
| 2003/0018561 A1 | 1/2003 | Kitchen et al. |
| 2003/0083978 A1 | 5/2003 | Brouwer |
| 2003/0115129 A1 | 6/2003 | Feaver et al. |
| 2004/0111355 A1 | 6/2004 | Hirani et al. |
| 2004/0162862 A1 | 8/2004 | Hull et al. |
| 2004/0236636 A1 | 11/2004 | Lutnick et al. |
| 2005/0149426 A1 | 7/2005 | Jokisch et al. |
| 2005/0149428 A1 | 7/2005 | Gooch et al. |
| 2006/0036535 A1 | 2/2006 | Hirani et al. |
| 2006/0143099 A1 | 6/2006 | Partlow et al. |
| 2006/0242061 A1 | 10/2006 | Axilrod |

OTHER PUBLICATIONS

Willa E. Gibson, "Are Swap Agreements Securities or Futures?: The Inadequacies of Applying the Traditional Regulatory Approach to OTC Derivatives Transactions", Winter 1999, University of Iowa, vol. 24, section II.E (cited as 24 Iowa J. Corp.).

BBA— British Banker's Association, "The BBA L1BOR fixing & definition", Nov. 7, 2002.

Determination of inside market midpoint

FIG. 6

Step 1 – Sort Bids from highest to lowest and Offers from lowest to highest.

| Contributed | |
|---|---|
| IM Bids | IM Offers |
| 39.500% | 41.000% |
| 40.000% | 42.000% |
| 41.000% | 43.000% |
| 45.000% | 47.000% |
| 32.000% | 34.000% |
| 38.750% | 40.000% |
| 38.000% | 39.500% |
| 41.000% | 42.750% |

| Sorted | |
|---|---|
| IM Bids | IM Offers |
| 45.000% | 34.000% |
| 41.000% | 39.500% |
| 41.000% | 40.000% |
| 40.000% | 41.000% |
| 39.500% | 42.000% |
| 38.750% | 42.750% |
| 38.000% | 43.000% |
| 32.000% | 47.000% |

Tradeable Markets
Matched Markets
Best Half

Step 2 – Ignore all Tradeable Markets.

Step 3 – The Inside Market Midpoint is the mean of the Best Half of the remaining Matched Markets. If there is an odd number of Matched Markets, round up.

| Best Half | |
|---|---|
| IM Bids | IM Offers |
| 40.000% | 41.000% |
| 39.500% | 42.000% |
| 38.750% | 42.750% |

Inside Market Midpoint = Average (40, 41, 39.5, 42, 38.75, 42.75) = 40.667%, rounded to 40.625%

FIG. 7

Step 1 – Considering only the Tradeable Markets, reverse the order of the Inside Market Offers to match the best (higher) bids with the worst (higher) offers.

Tradeable

| IM Bids | IM Offers |
|---|---|
| 45.000% | 40.000% |
| 41.000% | 39.500% |
| 41.000% | 34.000% |

} Tradeable Offers Reversed

Step 2 – Each Automatic Trade is matched at the midpoint between the Inside Market Bid and the Inside Market Offer.

Trade Levels

| IM Bids | IM Offers | Trade Price |
|---|---|---|
| 45.000% | 40.000% | 42.500% |
| 41.000% | 39.500% | 40.250% |
| 41.000% | 34.000% | 37.500% |

FIG. 8

CREDIT EVENT FIXINGS

REFERENCE TO RELATED APPLICATIONS

This application claims priority to U.S. Provisional Application No. 60/783,074, filed Mar. 17, 2006, the contents of which are hereby incorporated by reference.

FIELD OF INVENTION

This invention relates generally to determining the fair market value of a financial instrument, more particularly determining the fair market value of a credit derivative contract following a credit event.

BACKGROUND OF INVENTION

Currently, conventional credit derivative markets include a user base of larger institutions. These large institutions use the credit derivative markets for a variety of reasons. For example, commercial banks, both domestic and foreign, can obtain significant economic, regulatory, and capital relief from selling credit risk in a credit derivative market. Commercial banks can also use the credit derivative markets to add credit risk to their portfolios as an alternative to the lending market. Insurers, which typically posses excellent credit evaluation skills, primarily use the credit derivative markets to take on credit risk for a premium. Investment management companies and Hedge Funds, or other investors, use the credit derivative markets to both take on and shed risk.

The dealer community represents some of the largest financial intermediaries in the world. The dealers tend to be large, multi-national institutions that make markets in credit derivatives. The scale and scope of each dealer's credit derivative business varies widely, with some dealers having extensive credit derivative operations, and other being occasional market participants. Thus, in conventional credit derivative markets, information flow is concentrated in a few dealers. Generally, the end users, such as those described above, transact through the dealers and not directly with each other. Often, information is scarce and incomplete as it relates to the buyers and dealers participating in the market, as is information concerning price and the risk associated with particular derivatives.

Dealers transact with other dealers via a broker market. A broker is an intermediary that transacts business between dealers. The brokers do not principal risk. Generally, information dissemination from the brokers is very inefficient. Further, the brokers business is limited to the dealers, because there is no meaningful contact between the brokers and end users.

The flow of information is even more important when a credit event occurs. A credit event is typically an event defined within the credit derivatives contract, that happens in respect to the reference entity. It is usually defined in the Master Agreement of a credit derivatives contract. The three credit events of the reference entity that are defined by the International Swaps and Derivatives Association (ISDA 2003), include Bankruptcy, Failure to Pay, and Restructuring.

Following a credit event, the value of the credit derivatives can fluctuate widely. This occurs because the market standard form of settlement is "physical settlement" which requires that protection buyers deliver bonds to protection sellers to fulfill their contractual obligations. Since credit derivative contracts are synthetic and can be created irrespective of the number of bonds outstanding, the number of credit derivative contracts for a particular company often far outnumber the bonds issued by that company. This results in a "squeeze" artificially inflating the price of the bond due to the high demand. Accordingly, a need exists for a method to determine cash settlement prices for credit derivative trades following a credit event, such as a corporate bankruptcy. Cash settlement eliminates the need for protection buyers to deliver bonds and allows for efficient settlement of credit derivative contracts following a credit event.

SUMMARY OF THE INVENTION

Credit event fixings are auctions to determine cash settlement prices for credit derivative trades following a credit event, such as a corporate bankruptcy. Credit event fixings are designed to ensure a transparent and fair price representative of the trading market level, for use in the settlement of credit derivative trades.

During a credit event fixing, dealers place executable orders on the online platform for obligations of a particular company that has undergone a credit event. The methods and systems described herein are used to simultaneously execute these orders and generate a final cash settlement price for eligible credit derivative contracts referencing this entity.

One method is a method including accepting at least one inside market submission and at least one market order from each participating bidder in a credit derivative auction following a credit event, and determining a price for credit derivatives utilizing the market submissions and market orders. Preferably, the market submissions include at least one bid to buy credit derivatives. Preferably, the market submissions include at least one offer to sell credit derivatives.

Preferably, the method further includes determining if a minimum number of inside market submissions have been received prior to determining the price for the credit derivatives. Preferably, the method also further includes waiting until a minimum number of inside market submissions have been received prior to determining the price for the credit derivatives.

Preferably, determining a price for the credit derivatives includes determining an inside market midpoint. Preferably, the price is the inside market midpoint. Preferably, determining the inside market midpoint includes matching inside market offers and bids. Preferably, the matched inside market offers and bids are grouped into tradable matched market submissions and non-tradable market submissions. Preferably, method also includes trading the tradable matched market submissions.

Preferably, the inside market midpoint is calculated from a selection of the non tradable market submissions. Preferably, the non-tradable market submissions are converted into limit orders.

Preferably, the method further includes accepting at least one limit order from a participating bidder in the auction. Preferably, the method further includes matching market orders to determine open interest. Preferably, the method also further includes matching the open interest to one or more limit orders. Preferably, the price is the matched limit order comprising a highest offer or a lowest bid.

A credit event authority according to the invention may include a database configured to store credit derivative information for a certain reference entity, memory configured to store execution instructions; and a processor coupled with the database and the memory, the processor configured to execute the instructions, the instructions configured to cause the processor to receive a at least one inside market submission and at least one market order from each participating bidder in the auction, determining a price for the credit derivatives utilizing the market submissions and market orders.

A credit derivative trading system may include a credit event authority, a plurality of terminals configured to allow a plurality of participating bidders to interface with the credit event authority, and a standardized interface that allows each of the plurality of participating bidders to interface with the credit event authority and submit inside market submissions and market orders, the standardized interface configured to display the information for trading credit derivatives following a credit event in a compact and uniform format.

A method of auctioning credit derivatives following a credit event may include accepting at least one inside market submission and at least one market order from each participating bidder in the auction, and determining a price for the credit derivatives utilizing the market submissions and market orders.

DETAILED DESCRIPTION OF THE INVENTION

Definitions

Following is a list of terms used herein and their meanings:

An "Administrator" means the entity or entities who manage the auction.

"Auction Date" means the date the auction occurs on.

"Bidding Period" means any time set by the administrators for submitting bids.

"Crossing Market" means any matched market for which the inside market bid is higher than the inside market offer.

"Credit Event" means an event such as a bankruptcy or restructuring that triggers a credit default swap contract.

"Cut-off Date" means the last date for bidders to register for the auction.

"Deliverable Obligation" may be the credit derivative reference obligation or one of a broad class of obligations meeting certain specifications decided on prior to the auction.

"Inside Market Bid" means a firm quotation, submitted as part of a valid inside market submission, of the price at which the participating bidder agrees to purchase an amount of deliverable obligations with a predetermined outstanding principal balance.

"Inside Market Offer" means a firm quotation, submitted as part of a valid inside market submission, of the price at which the participating bidder agrees to sell an amount of deliverable obligations with a predetermined outstanding principal balance.

"Limit Bid" means a firm quotation, submitted as part of a limit order submission, of the price at which the participating bidder agrees to purchase an amount of deliverable obligations with an outstanding principal balance up to or equal to the quotation amount stated in such. Preferably, the bid must be less than or equal to the price of the inside market bid that such participating bidder submitted in its valid inside market submission.

"Limit Offer" means a firm quotation, submitted as part of a limit order submission, of the price at which the participating bidder agrees to sell an amount of deliverable obligations with an outstanding principal balance up to or equal to the quotation amount stated in such submission. Preferably, the offer must be greater than or equal to the price of the inside market offer that such participating bidder submitted in its valid inside market submission.

"Limit Order Submission" means a submission from a participating bidder received by the administrators during the bidding period or subsequent auction bidding period, as appropriate, of a limit bid and/or a limit offer. Preferably the offer is expressed as a percentage (in increments of one eighth of one percent (e.g., 35.375%)) and a quotation amount is stated.

"Market Bid" means a firm bid, received by the administrators during the bidding period or subsequent auction bidding period, as appropriate, to purchase at the final price deliverable obligations with an outstanding principal balance up to the quotation amount stated in the submission for regular way settlement at a predetermined time, for example, three business days after the notice of bond settlement date, without accrued interest.

"Market Offer" means a firm offer, received by the administrators during the bidding period or subsequent auction bidding period, as appropriate, to sell at the final price deliverable obligations with an outstanding principal balance up to the quotation amount stated in the submission for regular way settlement at a predetermined time, for example, three business days after the notice of bond settlement date, without accrued interest.

"Market Order" means a market bid or a market offer submitted by a participating bidder and received by the administrators during the bidding period.

"Materiality Event" means an event or news the occurrence of which has or could have a significant effect on the price of one or more of the deliverable obligations.

"Non-Tradable Market" means any matched market that is not a tradable market.

"Offer" means any limit offer or any inside market offer.

"Open Interest" means the difference between (a) the sum of all market bids and (b) the sum of all market offers, in each case, submitted in connection with the first auction described herein.

"Participating Bidder" means any institution that has been approved to participate in the auction.

"Pro Rata" means that participating bidder's orders are matched proportionally with respect to the quotation amount of each such order and the total amount of orders that can be matched in the relevant part of the auction.

"Quotation Amount" means the amount stated as the notional amount with respect to a particular limit bid, limit offer, inside market bid, inside market offer, market order or subsequent market order in a participating bidder's submission, which amount can be an integral multiple of, for example, US $1,000,000.

"Submission" means, with respect to a participating bidder, any valid inside market submission or limit order submission of such participating bidder or market order, subsequent limit order or subsequent market order submitted by such participating bidder to the administrators.

"Touching Market" means any matched market for which the inside market bid and inside market offer are equal.

"Tradable Market" means any matched market that is a crossing market or a touching market.

"Valid Inside Market Submission" means a submission from a participating bidder received by the administrators during the bidding period of both an inside market bid and an inside market offer, each expressed as a percentage (preferably in increments of one eighth of one percent (e.g., 35.375%)) and preferably which do not differ from one another by more than a predetermined amount (for example, 2.00% of par), and for which the inside market bid is not greater than or equal to the inside market offer.

Auction Methodology

Figure 1:
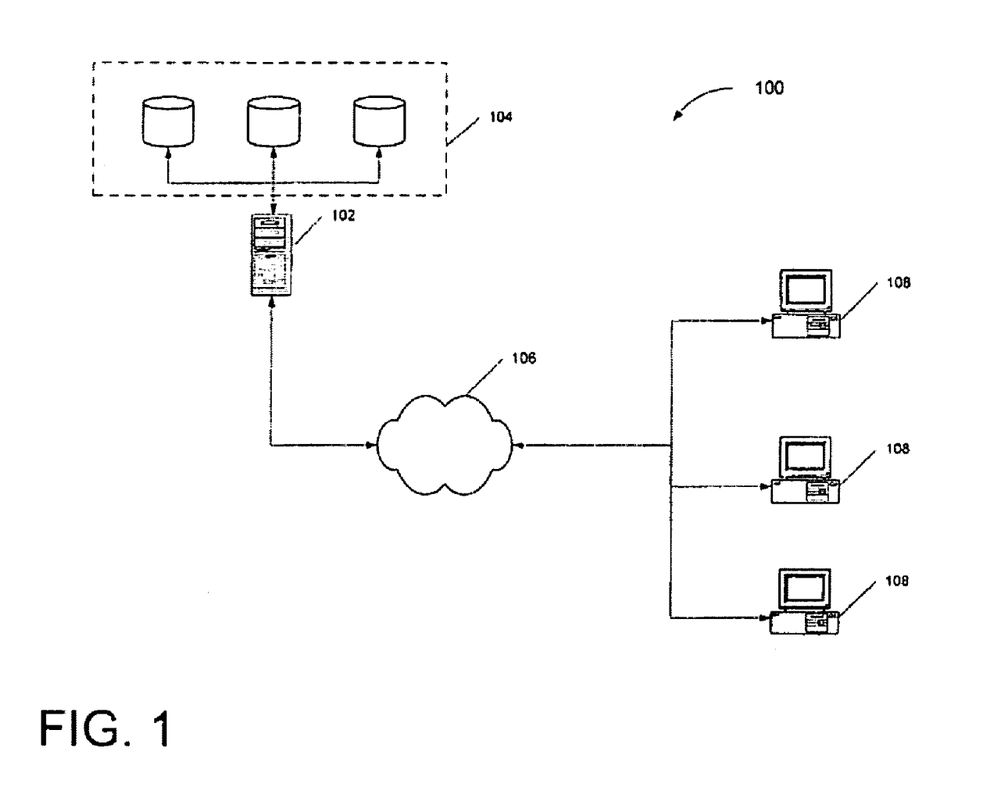
FIG. 1 is a diagram illustrating an example credit event fixings trading system in accordance with one embodiment of the invention.

FIG. 1 is a diagram illustrating an example of the credit event fixings trading system 100. System 100 includes a credit event authority 102 interfaced with a database 104. Credit event authority 102 is operated by one or more administrators. Database 104 can, as illustrated, actually include a plurality of databases depending on the embodiment. Credit event authority 102 is interfaced with a plurality of participating bidders via terminals 108 through network 106.

In one embodiment, network 106 is the internet; however, network 106 can be any type of wired or wireless wide area network, wired or wireless local area network, or even a wired or wireless personal area network, or some combination thereof. Further, in certain embodiments credit event authority 102 and/or terminals 108 can be interfaced with network 106 via wired and/or wireless communication links, while in another embodiment, credit event authority 102 and/or terminals 108 are interfaced with network 106 via wired communication links.

In one embodiment, terminals 108 are computer terminals, such as desktop or laptop computers. In other embodiments, terminals 108 are handheld devices, such as handheld computers or personal digital assistants. It will be apparent, however, that terminals 108 can be any type of terminal configured to include the functionality utilized by the systems and methods described herein.

The term "authority" used to identify credit event authority 102 is intended to indicate that terminals 108 communicate with credit event authority 102 through the computing systems, hardware and software, associated with credit event authority 102. Thus, depending on the embodiment the term authority can refer to one or more servers, such as internet or web servers, file servers, and/or database servers, one or more routers, one or more databases, one or more software applications, one or more Application Program Interfaces (APIs), or some combination thereof. Further, the computing system associated with credit event authority 102 can include one or more computers or computer terminals. To that extent, some of the same components that include the computer system associated with credit event authority 102 can also include terminals 108. An exemplary embodiment of a computer system that can include credit event authority 102 is described in more detail with respect to FIG. 7.

System 100 preferably includes a standardized interface that allows the participating bidders to define positions with credit event authority 102 prior to a credit event fixing. Credit event authority 102 is configured to then store the positions in database 104. Using the standardized interface, credit event authority 102 displays information related to the positions stored in database 104 to the participating bidders via terminals 108. The credit event authority 102 then calculates a final price and determines any associated transactions.

Figure 2:
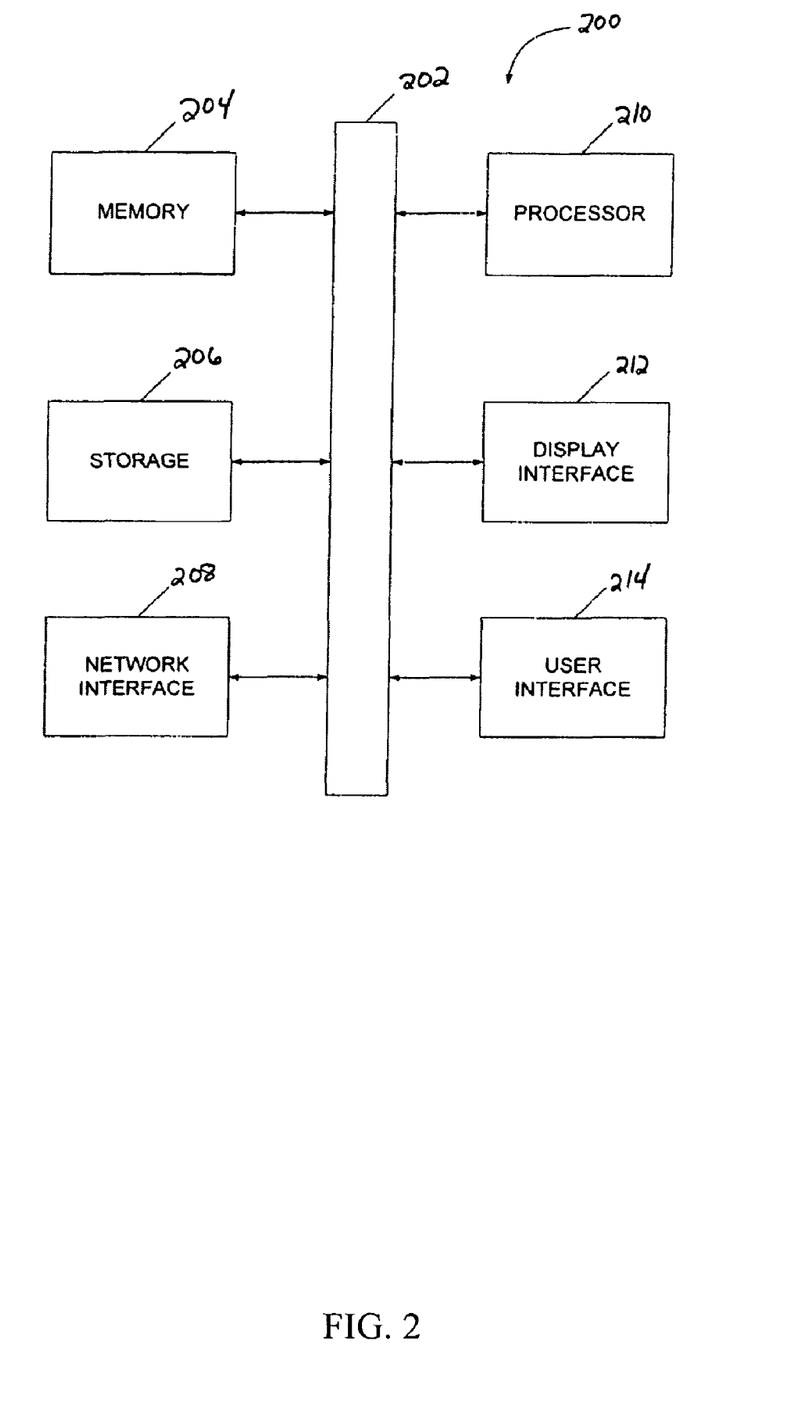
FIG. 2 is a logical block diagram illustrating an exemplarily computer system that can be included in the system of FIG. 1.

FIG. 2 is a logical block diagram illustrating an exemplary embodiment of a computer system 200 that is, for example, included in the computer system that includes credit event authority 102. As will be understood, some type of processing system is always at the heart of any computer system, whether the processing system includes one or several processors included in one or several devices. Thus, computer system 200 of FIG. 2 is presented as a simple example of a processing system. In the example of FIG. 2, computer system 200 includes a processor 210 configured to control the operation of computer system 200, memory 204, storage 206, a network interface 208, a display output 212, a user interface 214, and a bus 202 configured to interface the various components comprising computer system 200.

Processor 210, in one embodiment, includes a plurality of processing circuits, such as math coprocessor, network processors, digital signal processors, audio processors, etc. These various circuits can, depending on the embodiment, be included in a single device or multiple devices. Processor 210 also include an execution area into which instructions stored in memory 204 are loaded and executed by processor 210 in order to control the operation of computer system 200. Thus, for example, by executing instructions stored in memory 204, processor 210 causes credit event authority 102 to execute the steps described above.

Memory 204 includes a main memory configured to store the instructions just referred to. In one embodiment, memory 204 also include secondary memory used to temporarily store instructions or to store information input into computer system 200, i.e., memory 204 acts as scratch memory also. Memory 204 can includes, depending on the embodiment, a plurality of memory circuits, which can be included as a single device, or as a plurality of devices.

Storage 206 includes, in certain embodiments, a plurality of drives configured to receive various electronic media. For example, in one embodiment, storage 206 includes a floppy drive configured to receive a floppy disk, a compact disk drive configured to receive a compact disk, and/or a digital video disk drive configured to receive a digital video disk. In another embodiment, storage 206 also includes disk drives, which can include removable disk drives. The drives included in storage 206 are used to receive electronic media that has stored thereon instructions to be loaded into memory 204 and used by processor 210 to control the operation of computer system 200.

Network interface 208 is configured to allow computer system 200 to interface with, and communicate over, network 106. Thus, using a network interface, such as network interface 208, credit event authority 102 is able to communicate with terminals 108. Depending on the embodiment, credit event authority 102 includes one or multiple network interfaces 208.

Display interface 212 can be configured to allow computer system 200 to interface with a display. Thus, in certain embodiments, computer system 200 displays information to a user via display interface 212.

User interface 214 is configured to allow a user to interface with computer system 200. Thus, depending on the embodiment, user interface 214 can include a mouse interface, a keyboard interface, an audio interface, etc.

The standardized interface can include software components configured to run on credit event authority 102 as well as client software components configured to run on terminals 108. Thus, credit event authority 102 can work in conjunction with the client software running on terminals 108 to format and display information to the participating bidders in a uniform manner and to receive input from the participating bidders through terminals 108 in a manner that allows quick, easy, and efficient transactions. Certain features and aspects of the standardized interface are discussed more fully below.

As an example of the compact and uniform display of information, credit event authority 102 is configured in certain embodiments, to display the following for each participating bidder defined in system 100: a reference entity name, a quotation amount, an inside market bid and inside market offer, the fixing midpoint and deliverables and, market orders and limits orders. Credit event authority 102 is configured, for example, to display the information using the standardized interface described above. Thus, credit event authority 102 retrieves the relevant information from database 104 and transmits it to a client application, or applications, running on terminals 108. The client applications then display the information in accordance with the systems and methods described herein.

Figure 3:
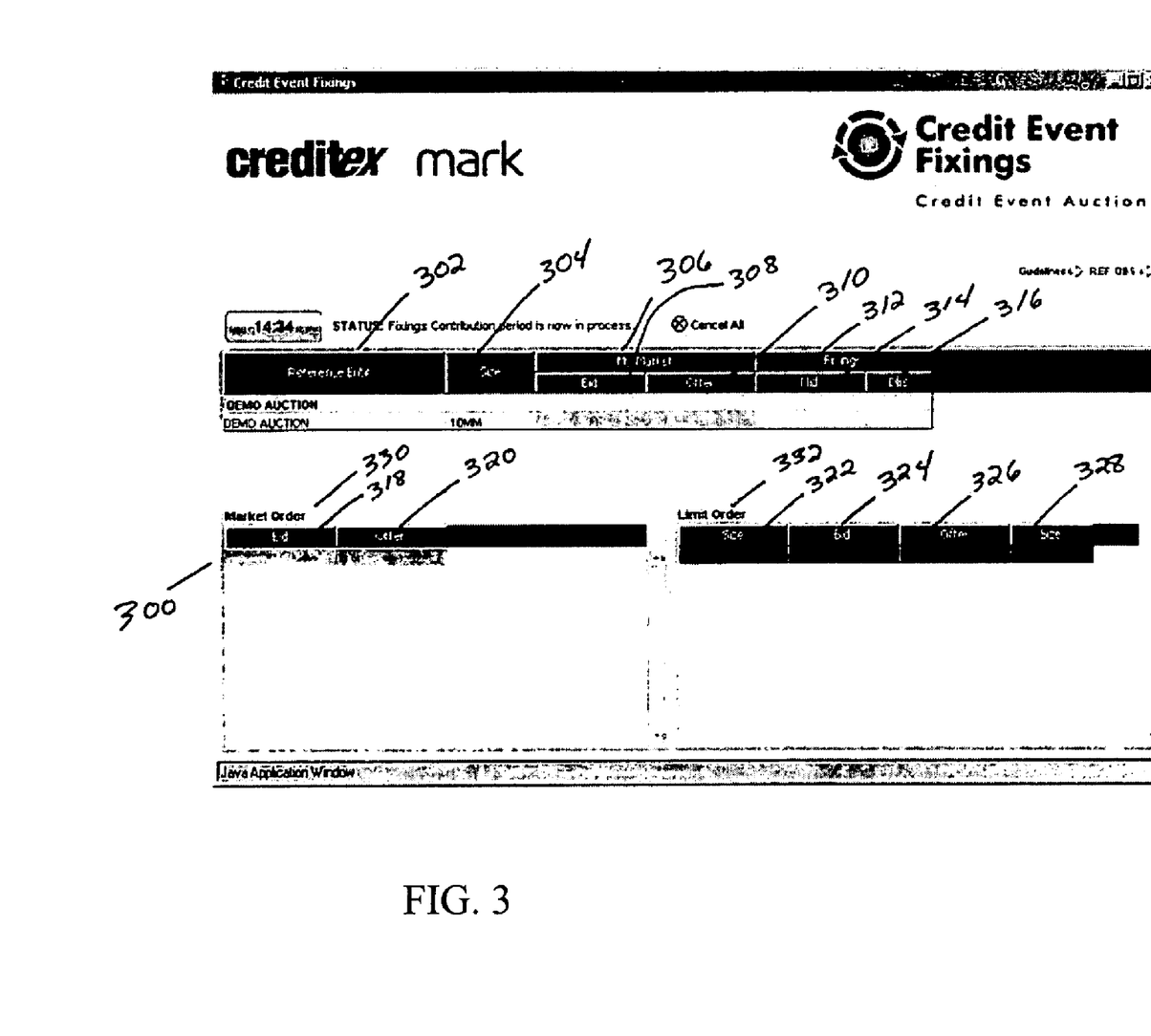
FIG. 3 is a screen shot illustrating one example of a method of displaying the information on participating bidder terminals using a compact and uniform format.

FIG. 3 is a screen shot illustrating one example of a method of displaying the information on terminals 108 using a compact and uniform format. Each participating bidder that is participating in the credit event fixing auction is preferably signed into their own specific terminal, which displays information relevant to their specific positions in the auction. The display screen 300 in FIG. 3 includes a plurality of columns 302-328. As shown in FIG. 3, column 302 includes the names of various reference entities for which credit derivatives have been made available in system 100. Column 304 includes the quotation amount associated with each reference entity in column 302. Column 306 includes the inside market bid column 308 and inside market offer column 310 for the participating bidder utilizing the terminal 108.

Window 330 includes the market orders for the participating bidders including bid prices in column 318 and offer prices in column 330. These orders are specific to the participating bidder signed into terminal 108.

Window 332 includes limit orders for the participating bidders, including the bid size in column 322, the bid price in column 324, the offer price in column 326 and the offer size in column 328. These orders are again preferably specific to the participating bidder signed into terminal 108.

In certain embodiments, the participating bidders can customize their view of the information displayed. Thus, for example, the credit event authority 102 may receive, from a participating bidder, information defining the customized view requirements of a participating bidder, i.e., using the standardized interface, a participating bidder inputs information defining a customized view.

Figure 4:
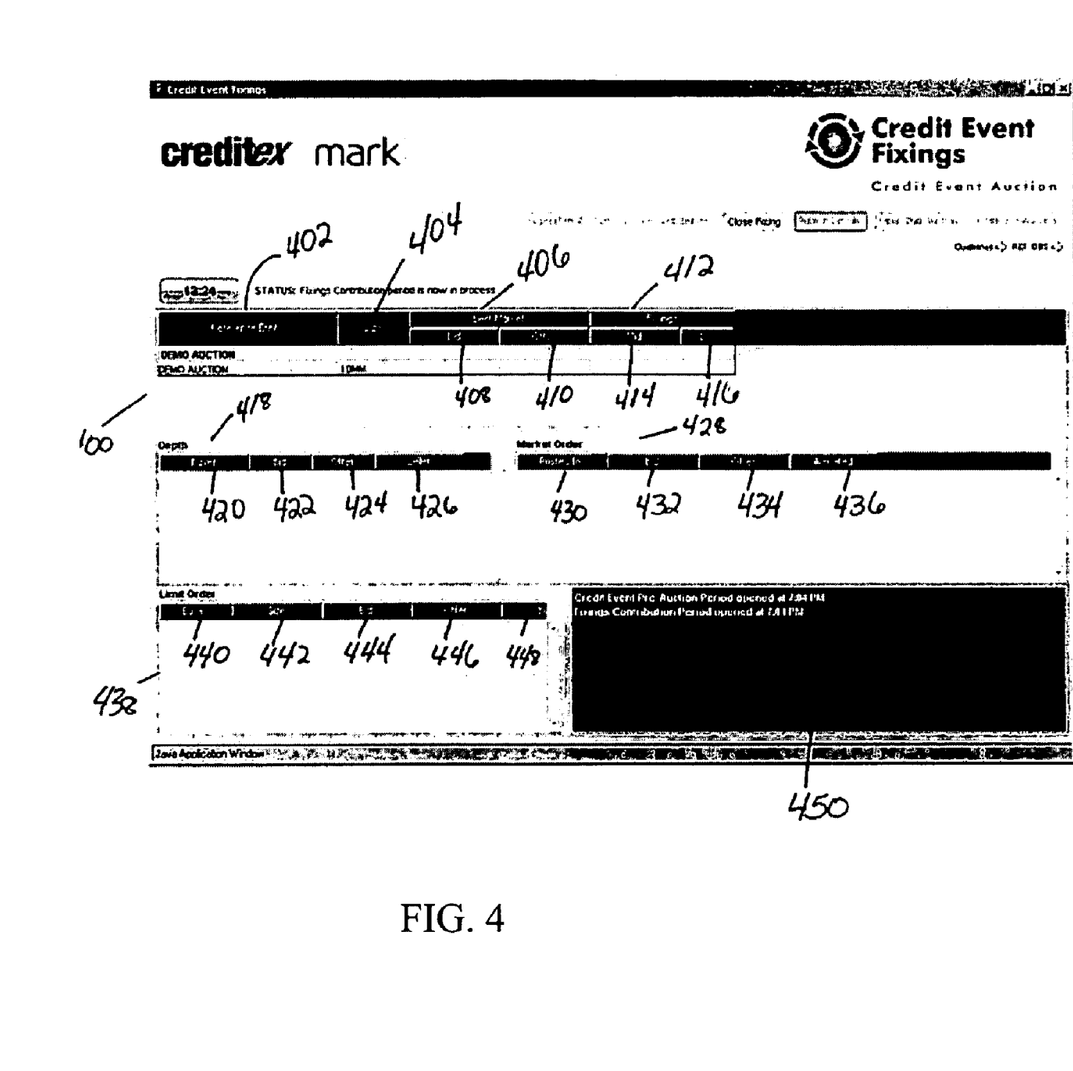
FIG. 4 is a screen shot illustrating one example of a method of displaying information on a credit event authority system in a compact and uniform format.

FIG. 4 is a screen shot illustrating one example of a method of displaying the information on display interface 712 of credit event authority system 102 in a compact and uniform format. The format is similar to the format used in FIG. 3 for terminals 108, except that the display interface displays the information relevant to all of the participating bidders, not just the information relevant to only a single participating bidder.

The display screen 400 in FIG. 4 includes a plurality of columns 402-448. Column 402 includes the names of various reference entities for which credit derivatives have been made available in system 100. Column 404 includes the quotation amount associated with each reference entity in column 402. Column 406 includes the best inside market bids in column 208 and best inside market offers in column 210 for the participating bidders.

Window 418 includes the market depth displaying the inside market bids and offers of participating bidders. Including the identification of the buyers in column 418. The bid prices of the buyers are listed in column 422. The identification of the sellers are listed in column 426 and the offer prices of the sellers are listed in column 424.

Window 428 includes the market orders for each of the participating bidders. The identification of the participating bidder making the market order is listed in column 430. The bid prices of the market orders are listed in column 432, the offer prices of the market orders are listed in column 434 and the amount of number of credit derivatives currently allocated to each of the market orders are listed in column 436.

Window 438 includes limit orders for each the participating bidders. The identification of the participating bidder making the limit order is listed in column 440. The bid sizes of the credit derivative trades are listed in column 442. The bid prices of the limit orders are listed in column 444. The offer sizes are listed in column 448 and the offer prices are listed in column 446.

Finally, window 450 is an activity window that lists the current status of the auction and allows the administrators to monitor bidders entering prices.

Figure 5:
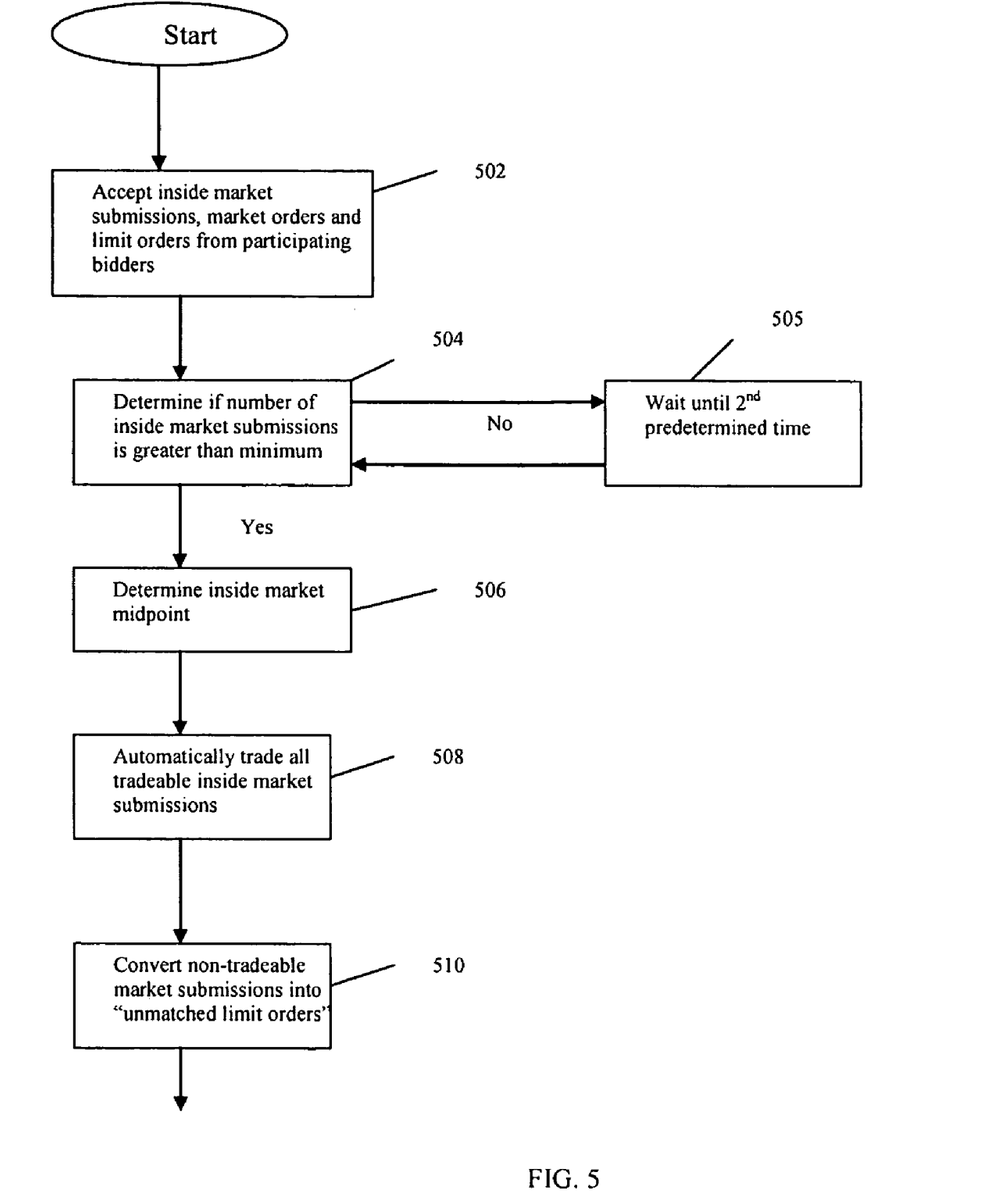
FIG. 5 is a flow chart depicting an auction method for determining the fixed priced of deliverable obligations following a credit event.

FIG. 5 is a flow chart depicting an auction method for determining the fixed priced of deliverable obligations following a credit event. Preferably, prior to the auction the administrators will publish a list of all participating bidders. At 502 each participating bidder will then be expected to submit to the system 100 a valid inside market submission. An inside market submission can be an inside market bid or offer. In addition, preferably each participating bidder is also expected to submit a market order. Finally, each participating bidder may also submit to the system 100 any number of limit orders submissions. Before an auction commences, there is a pre-auction period. The participating bidders can also preferably edit these orders, for example by changing the price or size of a bid during this time. The pre-auction period preferably lasts from one to four hours immediately prior to the auction.

At 504, the number of valid inside market submissions is then tallied by the system 100 at a first predetermined time. If the system 100 has not received at least the predetermined number of valid inside market submissions, the system 100 preferably then waits until a second predetermined time period at step 505. At the second predetermined time period, the system 100 returns to step 504 and again determined if at least a predetermined numbed of valid inside market submissions have been received. The predetermined number of valid inside market submissions may be a total for both bids and offers or a total or totals for just the valid inside market bids and/or valid inside market offers.

If the system 100 receives at least a predetermined number of valid inside market submissions, the system 100 will determine then determine the "inside market midpoint" at 506. One method of determining the inside market midpoint is provided with respect to FIGS. 6 and 7 below.

Figure 6:
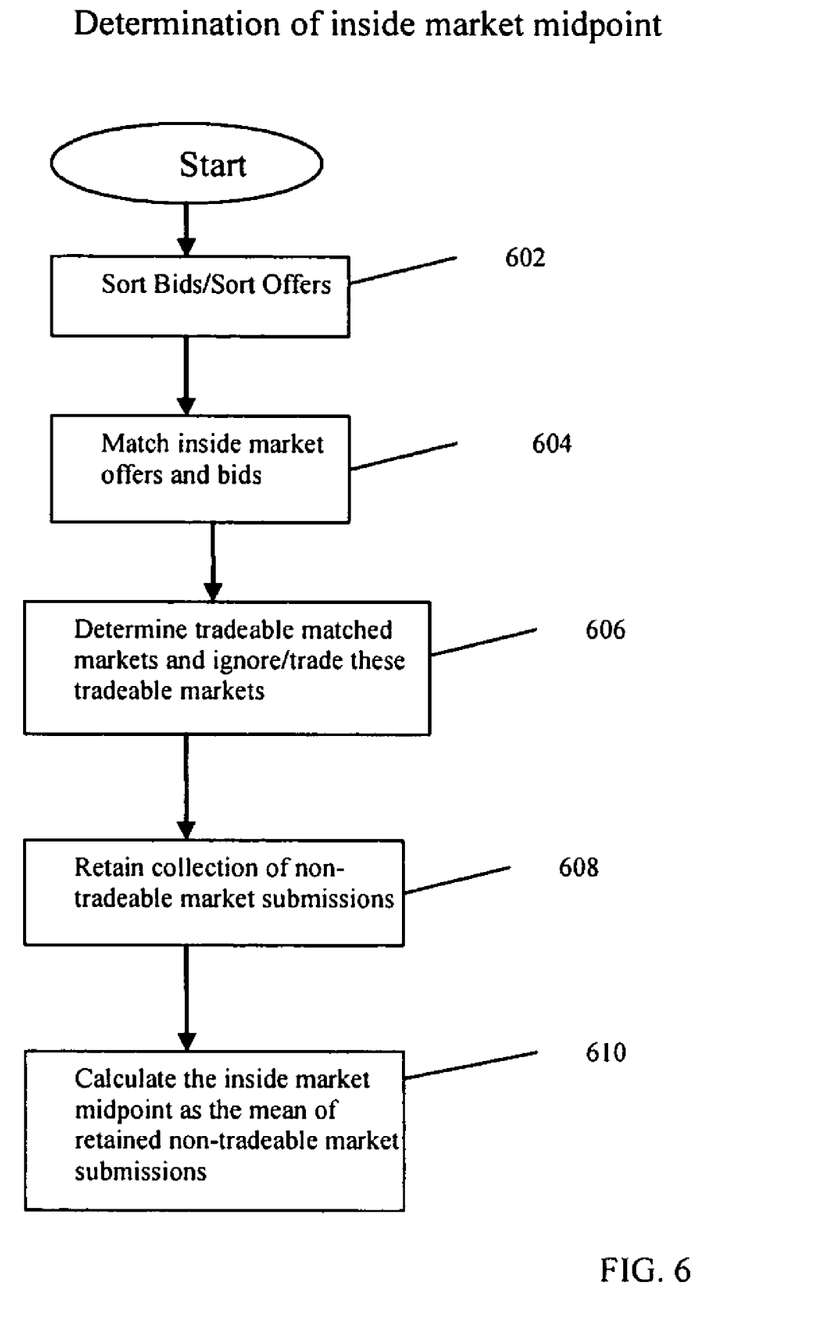
FIG. 6 is a flow chart illustrating a method of determining the inside market midpoint.
Figure 7:
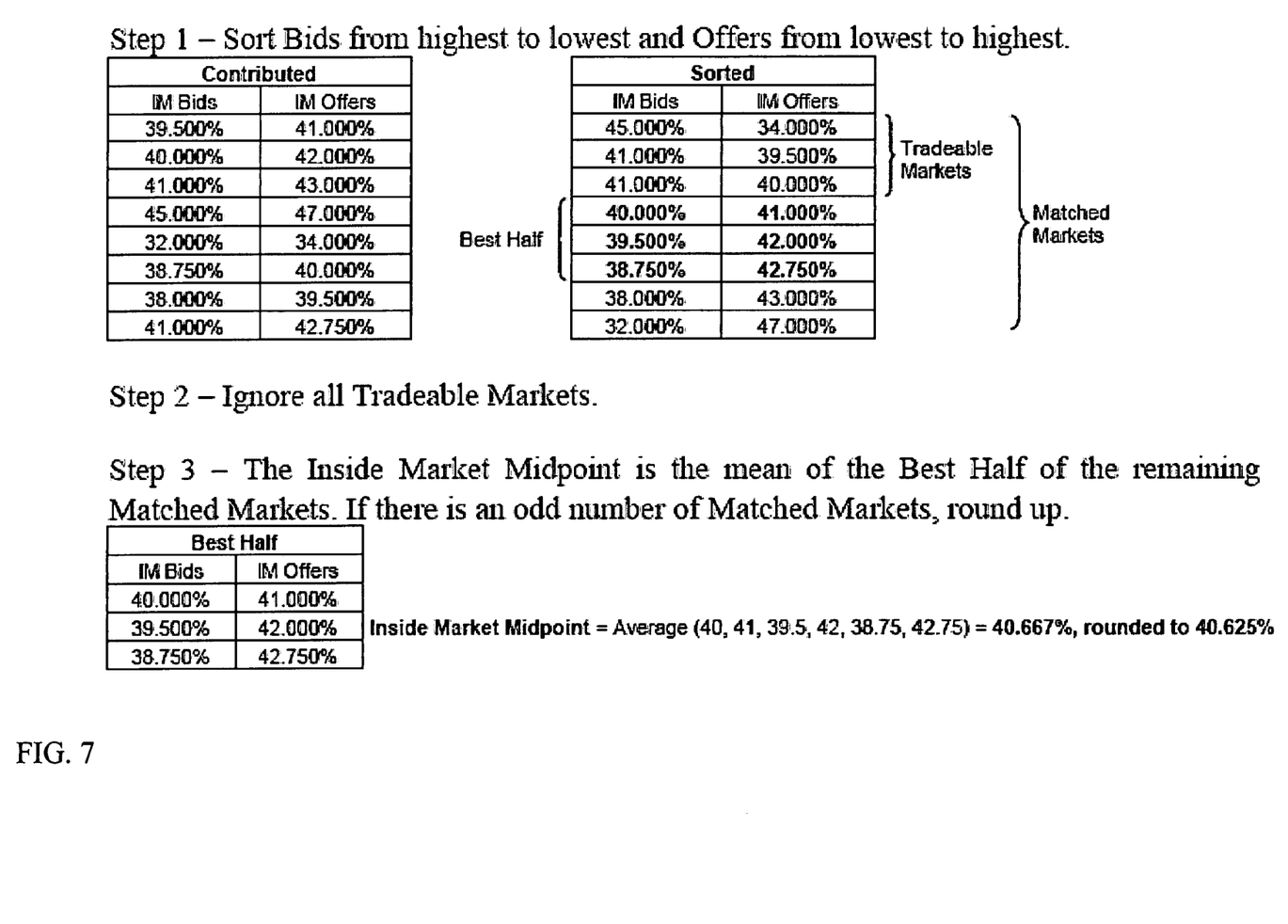
FIG. 7 is diagram showing an example of determining the inside market midpoint according to the method in FIG. 6.

FIG. 6 is a flow chart illustrating a method of determining the inside market midpoint. FIG. 7 is diagram showing an example of the steps described in FIG. 6

In FIG. 6 all of the inside market bids are sorted into a sequence with the highest bids first and the inside market offers are sorted into a sequence with the lowest offers first at 602. At 604, each inside market bid is then preferably matched with a corresponding inside market offer. The highest inside market bid being matched with the lowest inside market offer, the second highest inside market bid with the second lowest inside market offer, etc. Each such inside market bid/inside market offer pair constitutes a "matched market." Preferably, for purposes of sorting the inside market bids and inside market offers, where two inside market bids are equal, the one submitted first to the system 100 will be considered to be the higher of the two, and where two inside market offers are equal, the one submitted first to the system 100 will be considered to be the lower of the two.

The tradable matched markets are then determined at 606. The tradable matched markets are market pairs where the inside market bid is greater or equal to the matched inside market offer. As described with respect to FIG. 5, these matched pairs are preferably traded. However, for purposes of calculating the inside market midpoint, these matched tradable market pairs are preferably ignored. Process 602-606 are shown in Step 1 of FIG. 7.

All tradable markets and a predetermined number or percent of the non-tradable market submissions are preferably ignored at 608. This process is also shown as step 2 in FIG. 7. Preferably the "best half" of the non-tradable submissions are retained. To identify the best half, the system 100 can sort all non-tradable markets in order of the spread between the inside market bid and inside market offer within each matched market, from smallest spread to largest. The best half of the matched markets are those in the first half of such list. Preferably, in the event that the number of non-tradable markets is an odd number, the system 100 will round up the number of matched markets to be included in the best half.

At 610 the system 100 will then calculate the inside market midpoint by finding the mean of all the inside market bids and inside market offers included in the matched markets that fall within the best half or other selected number of retained submissions. Preferably, the results are rounded to the nearest one eighth of one percent. In other embodiments where the volume can be specified along with the bid and offer prices, the average can be computed by a simple average where each bid price and offer price is accounted for once or by a weighted average where each bid price and offer price is averaged based on the volume specified by the participant. This average is called the mid fixing. Process 608 and 610 are shown as step 3 in FIG. 7. This calculated value then acts as our circuit breaker point. So the auction fixing level preferably now can only be a certain number of points on either side of this value, for example, 15 points either way of this calculated value.

If the process described in FIG. 6 does not result in a single inside market midpoint for any reason, preferably the system 100 waits until more inside market submissions have been collected and then repeats the process described in FIG. 6 to determine a single inside market midpoint.

Once the inside market midpoint has been determined we return to step 508 in FIG. 5. At 508 preferably all inside market bids and offers that form part of a tradable market are automatically traded. The prices for these automatic trades are preferably decided according to the process illustrated in FIG. 8.

Figure 8:
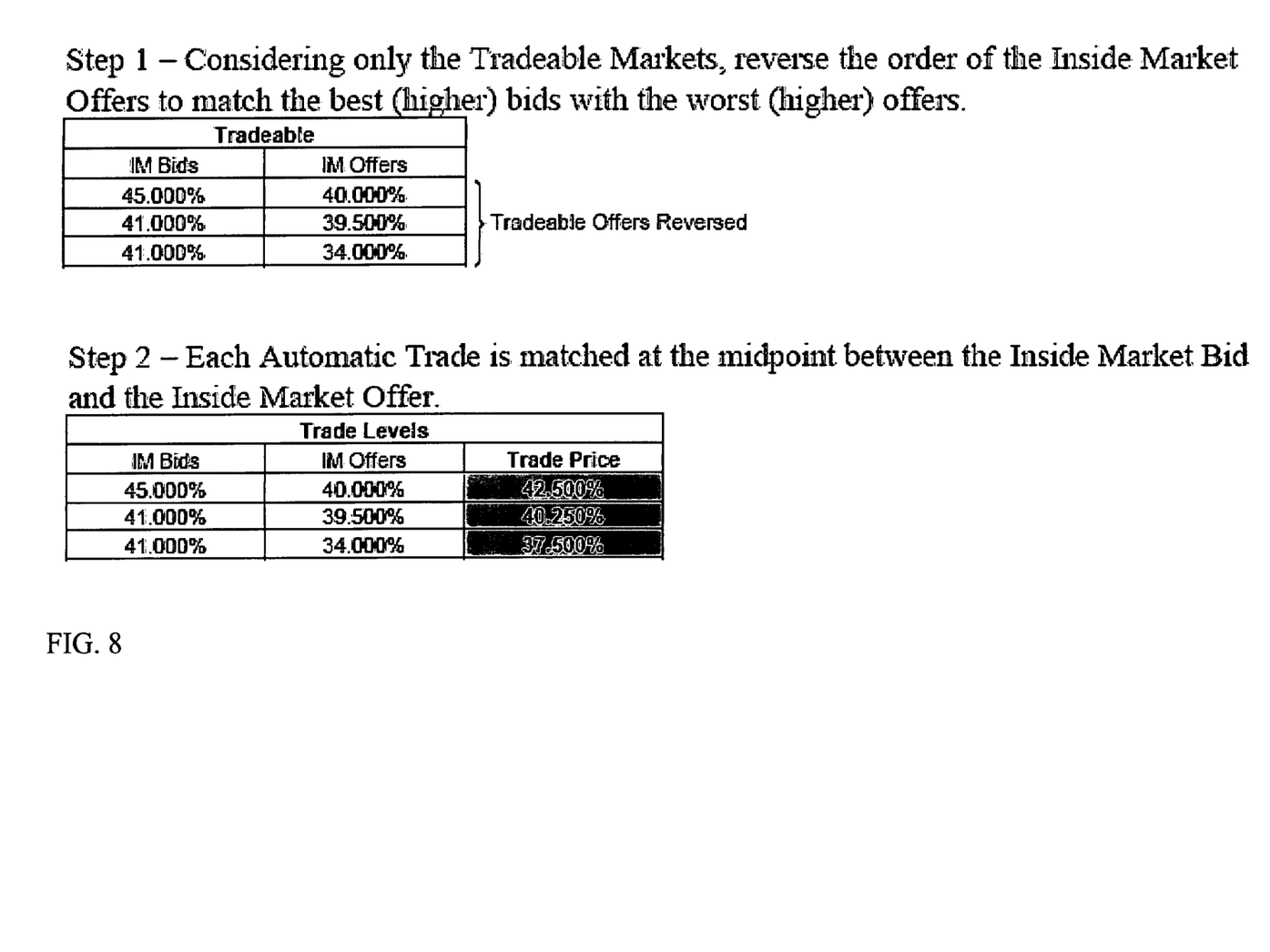
FIG. 8 is diagram showing an example of determining the automatic trades during an auction.

As shown in step 1 of FIG. 8, the system 100 preferably re-sorts all inside market offers included in tradable markets, placing them in order from highest to lowest, while the inside market bids remain in order from highest to lowest as well. Each inside market bid is then preferably matched with the corresponding inside market offer—the highest inside market bid being matched with the highest inside market offer, the second highest inside market bid with the second highest inside market offer, etc. each such pair is an automatic trade as shown in step 2 of FIG. 8.

Each automatic trade is preferably executed at a price equal to the midpoint between the inside market bid and inside market offer forming such automatic trade. The volume of deliverable obligations subject to each automatic trade is preferably a predetermined amount decided prior to the auction.

Again returning to the process described in FIG. 5, once all tradable markets are automatically traded, preferably at 510 all remaining inside market bids and inside market offers that do not form part of a tradable market are converted in "unmatched limit orders" and are combined with all limit bids and limit offers previously submitted by participating bidders.

Next if an inside market midpoint has been determined at 506 an attempt to set the final price of the credit derivative contracts is made in a first auction beginning at 512. In the first auction the system 100 preferably matches all market orders with one another in order to determine the open interest at 514. If the sum of all market offers is less than the sum of all market bids, all market offers are preferably matched pro rata with market bids, and if the sum of all market bids is less than the sum of all market offers, all market bids will be matched pro rata with market offers. Each such match is a "market order trade". These market order trades preferably will form a trade at the final price.

The system 100 then preferably matches the open interest against the corresponding unmatched limit orders at 516. If the open interest is a bid to purchase deliverable obligations, it is preferably matched against the unmatched limit orders that are offers. If the open interest is an offer to sell deliverable obligations, it will be matched against the unmatched limit orders that are bids. The open interest is preferably matched against each applicable unmatched limit order, beginning with the unmatched limit order that is the lowest offer or the highest bid, as the case may be, and moving to the next remaining lowest (in the case of offers) or next remaining highest (in the case of bids) preferably until: (A) the full amount of the open interest has been matched against unmatched limit orders totaling the same size as the open interest; (B) all of the unmatched limit orders of the relevant type have been matched to the open interest; or (C) the next unmatched limit order to be matched to the open interest is more than a predetermined percentage of par more, for example 15%, (in the case of offers) or less (in the case of bids) than the inside market midpoint, in which case all unmatched limit orders with a price less than (in the case of offers) or greater than (in the case of bids) such next unmatched limit order will be matched against the open interest. Each unmatched limit order that is matched to the open interest, under (A), (B) or (C) above, can be referred to as a "matched limit order", each matched limit order/market order pair, a "matched limit order trade" and the remaining unmatched open interest, the "unfilled open interest".

If, in (A) above, there are multiple unmatched limit orders stating the same price and each could be the final unmatched limit order to be matched to the open interest, then preferably such final unmatched limit orders will be filled pro rata against the remaining open interest.

At 518 it is determined whether the sum of all the market order trades and all the matched limit order trades is greater than a predetermined percentage. For example, the sum of the amounts of all the market order trades and all the matched limit order trades is checked if it is greater than a predetermined percentage, for example at least 90% of the greater of (i) the sum of the amounts of all market offers and (ii) the sum of the amounts of all market bids. If it is greater than this percentage, then the amount of remaining open interest is determined at 520. If the open interest is not zero the final price is preferably set at the price associated with the matched limit order that is the highest offer or the lowest bid, as the case may be at 526. If the open interest is zero, the final price will be the inside market midpoint at 522.

Preferably, if the sum of the amounts of all the market order trades and all the matched limit orders equals less than, for example 90% of the greater of (i) the sum of the amounts of all market offers and (ii) the sum of the amounts of all market bids, then the final price will be determined in a subsequent auction at 524.

If the first auction determines the final price pursuant to the process described with respect to FIG. 5, each participating bidder whose market order or matched limit order, as the case may be, forms part of either a market order trade or a matched limit order trade preferably is required to enter into a bilateral agreement to purchase an amount of deliverable obligations with an outstanding principal balance equal to the quotation amount in respect of the relevant market order trade or matched limit order trade, as the case may be, at the final price; provided that, in the case of the matched limit order trades containing the highest offer or the lowest bid, as the case may be, the quotation amount will, if necessary, be reduced to reflect the size of the remaining open interest. market orders that form part of the open interest will preferably be filled pro rata to complete the matched limit order trades. Participating bidders whose market order or matched limit order, as the case may be, forms part of a market order trade or matched limit order trade can be matched with one another alphabetically.

If a final price is not been determined according to the process described with respect to FIG. 5, the administrators can determine the final price in a subsequent auction 524.

In a subsequent auction, participating bidders may be required to submit subsequent market orders and may submit subsequent limit orders and/or replacement limit orders during the subsequent auction bidding period.

If the open interest from the first auction is a bid to purchase deliverable obligations, then: (A) if a participating bidder submitted a market order to purchase deliverable obligations, its subsequent market order preferably must be a bid to purchase deliverable obligations in a size that is equal to or less than such participating bidder's market order; and (B) if a participating bidder submitted a market order to sell deliverable obligations, preferably its subsequent market order must be an offer to sell deliverable obligations in a size that is equal to or greater than such participating bidder's market order.

If the open interest from the first auction is an offer to sell deliverable obligations, then: (A) if a participating bidder submitted a market order to sell deliverable obligations, its subsequent market order preferably must be an offer to sell deliverable obligations in a size that is equal to or less than such participating bidder's market order; and (B) if a participating bidder submitted a market order to purchase deliverable obligations, preferably its subsequent market order must be a bid to purchase deliverable obligations in a size that is equal to or greater than such participating bidder's market order.

The system 100 preferably will match all subsequent market orders with one another in order to determine the subsequent open interest. If the sum of all subsequent market offers is less than the sum of all subsequent market bids, all subsequent market offers preferably will be matched pro rata with subsequent market bids, and if the sum of all subsequent market bids is less than the sum of all subsequent market offers, all subsequent market bids will preferably be matched pro rata with subsequent market offers (each such match, a "subsequent market order trade").

The subsequent limit orders and replacement limit orders will preferably be reordered with all the relevant limit offers or limit bids, as the case may be, (e.g., if the open interest is a bid to purchase deliverable obligations, the relevant orders will be limit offers) and any inside market bids or inside market offers, as the case may be, that did not form part of a tradable market in the prior auction, beginning with the lowest offer or the highest bid, as the case may be; provided that any limit offers, limit bids, inside market offers or inside market bids that have been replaced by a replacement limit order will be disregarded in the subsequent auction. The system 100 will preferably then repeat the steps 514-526 above, treating (A) all such limit offers, limit bids, inside market bids and inside market offers from the first auction (that did not form part of an automatic trade) and all subsequent limit orders and replacement limit orders together as unmatched limit orders and (B) the subsequent open interest as the open interest for purposes of such section.

Preferably, the system 100 displays to the participating bidders at the end of the auction (a) the final price or, alternatively, their determination that a subsequent auction will be required along with the reason the first auction failed to obtain a final price; (b) the size and direction of the unfilled open interest or subsequent open interest, as the case may be, if any; (c) the names of the participating bidders who submitted bids, offers, subsequent limit orders and replacement limit orders, together with the details of all such bids and offers submitted by each (e.g., participating bidders and quotation amounts), except that where a subsequent auction will be required and has not yet been conducted, only the details of inside market bids and inside market offers will preferably be published; (d) the details of any automatic trades; and (e) preferably only concurrently with the publishing of the final price, the details and size of all market order trades, matched limit order trades or subsequent market order trades (for the avoidance of doubt, the administrators will not publish the details of any individual parties to any such trades nor any details of the individual market orders or subsequent market orders submitted by participating bidders).

Preferably, the results of the auction are verified by a third party separate from the administrators of the auction. In addition preferably, the administrators will publish on, for example on their own website or on a third party website the result of the auction.

Preferably, the published results include the final price determined during the credit event fixing or, alternatively, their determination that a subsequent auction will be required along with the reason the first auction's failure to obtain a final price. Preferably, the published results include the size and direction of any unfilled open interest or subsequent open interest, as the case may be. Preferably, the published results include the names of the participating bidders who submitted bids, offers, subsequent limit orders and replacement limit orders, together with the details of all such bids and offers submitted by each participating bidder (e.g., the name of the participating bidders and the quotation amounts), except that where a subsequent auction is deemed necessary and has not yet been conducted, preferably only the details of the inside market bids and inside market offers will be published.

Preferably, the published results include the details of any automatic trades. Preferably, the published results include, concurrently with the publishing of the final price, the details and size of all market order trades, matched limit order trades or subsequent market order trades (for the avoidance of doubt, the administrators will preferably not publish the details of any individual parties to any such trades nor any details of the individual market orders or subsequent market orders submitted by participating bidders), in each case within a predetermined time period of the bidding period or subsequent auction bidding period, as the case may be.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

Other embodiments and uses of the invention will be apparent to those skilled in the art from consideration of the specification and practice of the invention disclosed herein. All references cited herein, including all U.S. and foreign patents, patent applications, all publications and other documentary materials, are specifically and entirely hereby incorporated by reference.

What is claimed is:

1. A method for determining a fixed price of deliverable obligations following a credit event comprising:
   providing one or more terminals in communication with a credit event authority, wherein said credit event authority comprises at least one server and a processor;
   accepting at least one inside market submission and at least one market order at one or more of said terminals for transmission to the credit event authority, wherein said inside market submissions each comprises at least one inside market bid or inside market offer, and wherein said market orders each comprises at least one market order or market bid;
said credit authority:
   matching one or more inside market bids and inside market offers to form matched markets;
   identifying which of the matched markets are tradable, wherein a tradable matched market comprises an inside market bid that is greater than or equal to an inside market offer;
   determining an inside market midpoint based on a subset of the matched markets;
   automatically trading said tradable matched markets;
   matching all market orders with one another to determine an open interest;
   converting all inside market bids and inside market offers that do not form tradable matched markets into unmatched limit orders;
   matching the open interest against the unmatched limit orders to form a matched limit order;
   determining after the matching the open interest step whether any portion of the open interest remains unmatched; and
   setting a fixed price for the matched limit order based on the amount of unmatched open interest remaining, wherein if the remaining open interest is greater than or less than zero, said fixed price is set to the price associated with the matched limit order that is the highest offer or the lowest bid, and wherein if the remaining open interest is equal to zero, and fixed price is set to the inside market midpoint.

2. The method of claim 1, further comprising:
   tallying a number of inside market submissions at a first predetermined time; and
   determining if a minimum number of inside market submissions have been received prior to matching inside market bids and inside market offers.

3. The method of claim 1, further comprising waiting until a minimum number of inside market submissions have been received prior to matching inside market bids and inside market offers.

4. The method of claim 1, wherein determining the inside market midpoint comprises:
   sorting matched markets that are not tradable in order of spread, wherein each spread is the difference between the inside market bid and the inside market offer in a matched market; and
   calculating a mean from a subset of non-tradable matched markets based on the lowest spread.

5. The method of claim 1, further comprising:
   accepting at least one limit order submission at one or more of said terminals and transmitting said limit order submissions to the credit event authority, wherein said limit order submissions each comprises at least one limit offer or at least one limit bid;
   combining the unmatched limit orders with the limit bids and the limit offers prior to matching the open interest against the unmatched limit orders.

6. The method of claim 1, wherein the step of matching inside market bids and inside market offers comprises:
   sorting inside market bids from highest to lowest and sorting inside market offers from lowest to highest; and
   pairing corresponding highest to lowest inside market bids to lowest to highest inside market offers.

7. The method of claim 1, wherein the step of matching all market orders with one another to determine the open interest comprises:
   matching all market offers pro rata with market bids if the sum of all market offers is less than the sum of all market bids; and
   matching all market bids pro rata with market offers if the sum of all market offers is greater than the sum of all market bids.

8. The method of claim 1, wherein matching the open interest against the unmatched limit orders comprises:
   matching the unmatched limit order that comprises the lowest inside market offer or the highest inside market bid to the open interest; and
   matching the next remaining lowest inside market offer or highest inside market bid to the open interest until the full amount of the open interest has been matched against unmatched limit orders totaling the same size as the open interest.

9. The method of claim 1, wherein matching the open interest against the unmatched limit orders comprises:
   matching the unmatched limit order that comprises the lowest inside market offer or the highest inside market bid to the open interest; and
   matching the next remaining lowest inside market offer or highest inside market bid to the open interest until all of the unmatched limit orders of a relevant type have been matched to the open interest.

10. The method of claim 1, wherein matching the open interest against the unmatched limit orders to form the matched limit order comprises:
    matching the unmatched limit order that comprises the lowest inside market offer or the highest inside market bid to the open interest; and
    matching the next remaining lowest inside market offer or highest inside market bid to the open interest until the next unmatched limit order to be matched to the open interest is within a predetermined percentage of the inside market midpoint.

* * * * *